June 5, 1934.　　　J. T. CORLEY　　　1,961,198
PORTABLE MOUNTING FOR NOZZLES AND THE LIKE
Filed Nov. 6, 1931
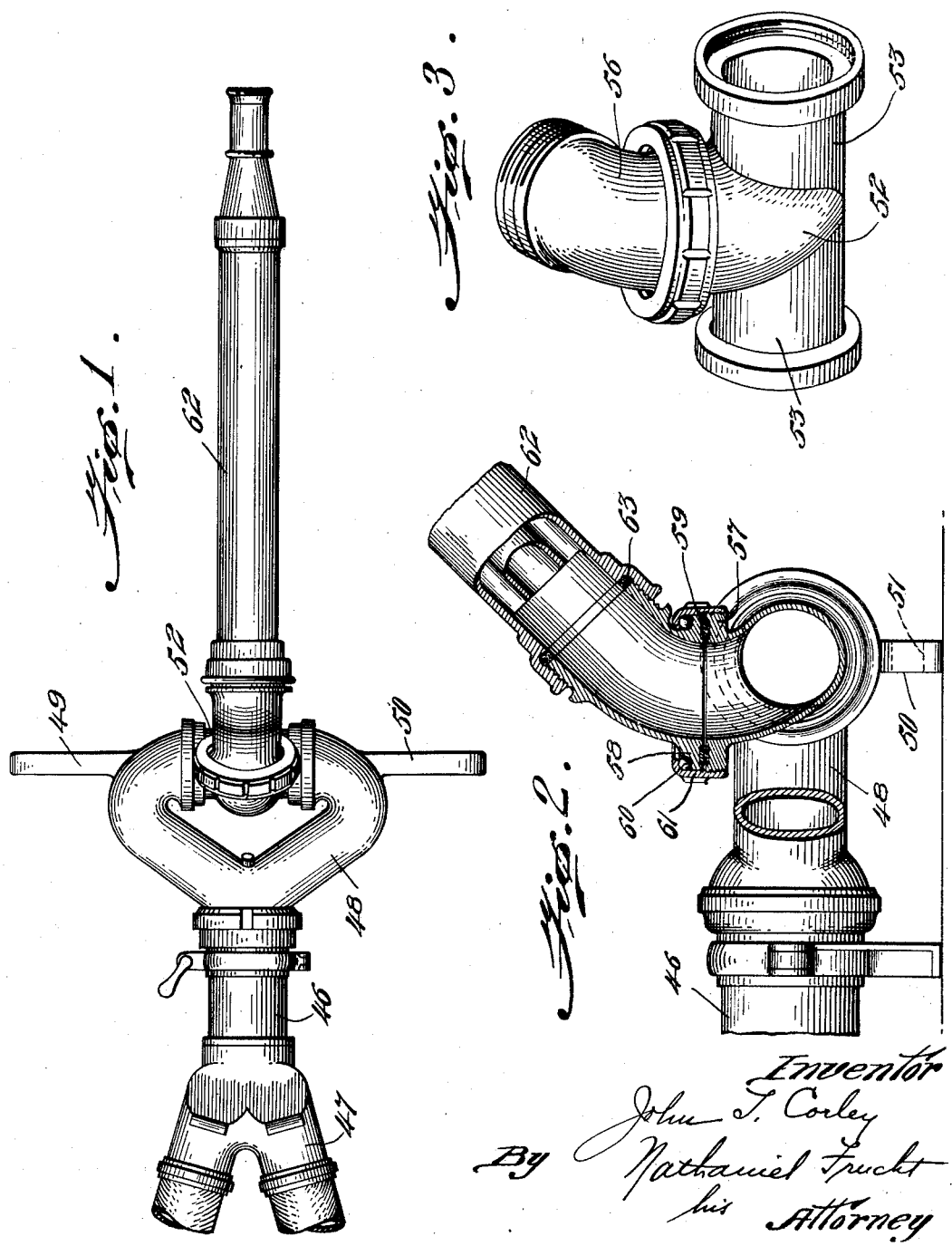

Patented June 5, 1934

1,961,198

UNITED STATES PATENT OFFICE 1,961,198

PORTABLE MOUNTING FOR NOZZLES AND THE LIKE

John T. Corley, Providence, R. I.

Application November 6, 1931, Serial No. 573,349

4 Claims. (Cl. 299—73)

My present invention relates to fire fighting equipment, and has particular reference to portable standpipes designed to permit and facilitate universal settings.

A difficulty inherent in the portable type, particularly in the case of a nozzle with hose connection, is the desirability to set the nozzle so as to be rigidly supported and to throw a stream in a desired direction, without further attention of the fireman. The object of my invention is therefore to so design a standpipe comprising a nozzle, that it will be rigidly held in adjusted stream directing position without further attention of the fireman.

With the above and other objects and advantageous features in view, the invention consists of a novel arrangement of parts more fully disclosed in the detailed description following, in conjunction with the accompanying drawing, and more particularly defined in the appended claims.

In the drawing,

Fig. 1 is a plan view of a universal standpipe construction;

Fig. 2 is an enlarged central sectional detail;

Fig. 3 is a perspective view of the split yoke;

It has been found desirable to provide a universal mounting for a fire truck or the like to which a standpipe or hose connection may be releasably secured, the mounting as a whole being detachable and also having detachable parts which facilitate construction and use; and the following is a detailed description of specific constructions which embody the principles of my invention.

In the drawing, the figures disclose a standpipe construction of the universal type, in which a barrel 46 has a Siamese connection 47 at one end thereof, and has a main yoke 48 swivelled on the other end thereof, preferably in the manner disclosed in my Patent No. 1,738,421. The yoke has two support legs 49, 50, extending laterally from the sides of the main yoke, these legs being preferably integral with the main yoke, and having hand holes 51 through which a fireman may place his hand, either to carry the standpipe, or else shift or hold it.

A split yoke 52 swivelled between the inturned ends of the yoke, the split yoke being in the form of a short Y, with the central portion 52 turned back as shown in Fig. 2 and the outwardly extending ends 53 of the Y engaging the inwardly turned ends of the main yoke.

The central portion of the split yoke is preferably formed of a rearwardly turned base elbow 55 and an upper forward swivel elbow 56, swivelled together as shown in Fig. 2, the base having an upper flange 57 and the swivel elbow a lower flange 58; both flanges have annular recesses to provide a mounting for an intermediate packing 59. The upper portion of the flange 58 serves as a ball race for ball bearings 60, the assembly being locked in place by the lock ring 61 which threadedly engages the flange 57 and the ball bearings to force the flanges into fluid tight engagement. A nozzle 62 is threaded on the free end of the swivel elbow, in the usual manner, with a packing 63 therebetween.

As shown in Fig. 2, the split yoke is split so as to position its swivel substantially horizontally when the nozzle is in its usual operative position of about 45 degrees to the horizontal. The nozzle may therefore be freely swung in a horizontal plane on the split yoke, and freely swung in a vertical plane on the main yoke.

The swivel elbow may be of any angular length, in order to obtain a desired swing of the nozzle; thus, a ninety degree elbow will position the nozzle parallel to the swivel connection and permit a swing of the nozzle in a plane parallel to the swivel connection.

The described construction provides a universal movement with a minimum number of parts, thus decreasing the cost of manufacture and reducing the net weight without loss of efficiency.

The effect of the ball bearing mounting is to reduce the turning force required for swivelling as the fluid pressure increases.

While I have described specific embodiments of my invention, such changes in the arrangement of the parts and in the sizes and relative dimensions of the parts, may be made as appear desirable to meet the requirements for different installations, within the spirit and the scope of the invention as defined in the appended claims.

I claim:

1. In a universal standpipe construction, a barrel, hose connections at one end thereof, a yoke at the other end thereof having two spaced ends, a second yoke having two spaced ends swivelly mounted on said first two spaced ends, and a nozzle member swivelly mounted on said second yoke, the plane of the second swivel being at an acute angle to the general nozzle member axis.

2. In a universal standpipe construction, a barrel, hose connections at one end thereof, a yoke at the other end thereof having two inwardly directed spaced ends, a second yoke having two outwardly directed spaced ends swivelly mounted on said first two spaced ends, and a nozzle member swively mounted on said second yoke, the plane of the second swivel being at an acute angle to the general nozzle member axis.

3. In a universal standpipe construction, a barrel, hose connections at one end thereof, a yoke at the other end thereof having two spaced ends, a second yoke having two spaced ends swively mounted on said first two spaced ends, an arcuate elbow member swively mounted on said second yoke, and a nozzle mounted on said elbow member.

4. In a universal standpipe construction, a barrel, hose connections at one end thereof, a yoke at the other end thereof having two inwardly directed spaced ends, a second yoke having two outwardly directed spaced ends swively mounted on said first two spaced ends, an arcuate elbow member swively mounted on said second yoke, and a nozzle mounted on said elbow member.

JOHN T. CORLEY.